(12) United States Patent
Bozich et al.

(10) Patent No.: US 6,748,285 B2
(45) Date of Patent: Jun. 8, 2004

(54) INTEGRATED SYSTEM FOR DESIGNING PRODUCT PACKAGING

(75) Inventors: Frank Anthony Bozich, LeVesinet (FR); Peter David Yates, McHenry, IL (US)

(73) Assignee: Rohm and Haas Company, Philadelphia, PA (US)

( * ) Notice: Subject to any disclaimer, the term of this patent is extended or adjusted under 35 U.S.C. 154(b) by 412 days.

(21) Appl. No.: 09/920,239

(22) Filed: Aug. 1, 2001

(65) Prior Publication Data

US 2002/0095518 A1 Jul. 18, 2002

Related U.S. Application Data

(60) Provisional application No. 60/246,037, filed on Nov. 6, 2000.

(51) Int. Cl.[7] .............................................. G06F 19/00
(52) U.S. Cl. .................... 700/97; 700/103; 700/104; 707/1; 707/2; 707/10
(58) Field of Search .................... 707/1–10, 100–104.1; 700/97, 103, 104, 118

(56) References Cited

U.S. PATENT DOCUMENTS

| | | | |
|---|---|---|---|
| 5,386,373 A | 1/1995 | Keeler et al. | 364/500 |
| 5,418,728 A * | 5/1995 | Yada | 700/97 |
| 5,548,528 A | 8/1996 | Keeler et al. | 364/497 |
| 5,552,995 A * | 9/1996 | Sebastian | 700/97 |
| 5,664,112 A | 9/1997 | Sturgeon et al. | 705/28 |
| 5,726,884 A | 3/1998 | Sturgeon et al. | 395/209 |
| 5,815,394 A * | 9/1998 | Adeli et al. | 700/97 |
| 5,832,411 A | 11/1998 | Schatzmann et al. | 702/23 |
| 5,912,678 A * | 6/1999 | Saxena et al. | 700/103 |
| 6,125,374 A * | 9/2000 | Terry et al. | 715/502 |
| 6,249,714 B1 * | 6/2001 | Hocaoglu et al. | 700/97 |
| 6,327,551 B1 * | 12/2001 | Peterson et al. | 703/1 |
| 2003/0083762 A1 * | 5/2003 | Farrah et al. | 700/97 |

* cited by examiner

*Primary Examiner*—Leo Picard
*Assistant Examiner*—Michael D. Masinick
(74) *Attorney, Agent, or Firm*—Stephen T. Falk

(57) ABSTRACT

A distributed system having a central server, one or more remote supplier nodes, one or more remote manufacturer nodes, and one or more remote client nodes that communicate with one another via the Internet. The server maintains a centralized component database containing information corresponding to the components sold by the suppliers that are potentially used in the manufacturer of packages. The server also maintains a centralized process database containing information corresponding to the manufacturing processes performed by the manufacturers that are potentially used in the manufacturer of packages. Each supplier and manufacturer is responsible for accessing the server via the Internet to store/update the information maintained in the appropriate database for its components/processes. Each client accesses the server via the Internet to provide a set of desired attributes for a proposed package. In response, the server compares the set of desired attributes with the information in its databases to generate and communicate back to the client a packaging solution that bests meets the client's goals.

21 Claims, 9 Drawing Sheets

TABLE I
Package Selection Tree

FIG. 4
TABLE II

Substrate Types:
1. Acrylonitrile
2. Cellulose     -     plain
                 -     coated
3. Fluoropolymer
4. Nylon         -     cast
                 -                       oriented
                 -                       metallized
5. Polyester -         plain
                 -                       treated
                 -                       heat sealable
                 -                       metallized
                 -                       industrial
6. Polyolefins  -      polythylene
                 -     Eva
                 -     Eaa
                 -     copolymer
                 -     special
7. Polypropylene -     cast
                 -                       coated, heat sealable
                 -                       coated, barrier
                 -                       coextruded
                 -                       metallized
                 -                       plain
8. Paper       -       plain
                 -                       coated
                 -                       synthetic
9. Aluminium-          unannealed
                 -                       annealed, plain
                 -                       primed
                 -                       coated
10. PVC        -       rigid
                 -                       plasticized

FIG. 5

TABLE III

Ink Types:
1. Rotogravure           - solvent based
   - water based
2. Flexographic          - solvent based
   - water based
3. Letterpress           - oxidation
   - heat set
   - moisture set
   - energy curable
4. Lithographic          - web offset
   - sheet offset
   - metal decorating
   - energy curable
5. Screen                - oxidation
   - solvent based
   - water based
   - energy curable

FIG. 6

TABLE IV

Adhesive Types:
1. Water based
    - Starch, derivatives
    - Silicates
    - Casein
    - Natural rubber latex
    - Acrylates
    - Polyvinyl Acetates
    - Polyvinylidene Chloride
    - Polyurethanes
    - Casein/Neoprene
    - Polyolefin
    - Urea formaldehyde
    - Polyamides
2. Solvent based
    - Rubber cements
    - Acrylates
    - Polyurethanes
    - Polyesters
3. 100% Solids
    - Waxes
    - EVA hot melts
    - Polyurethanes
    - Polyesters
    - Acrylates

FIG. 7

TABLE V
KEY ATTRIBUTES

1. Cost
2. Clarity
3. Light Barrier
4. Tensile Strength
5. Burst Strength
6. Peel Strength
7. Moisture Barrier
8. Gas Barrier
9. Heat Resistance
10. Chemical Resistance
11. Humidity Resistance
12. Runnability
13. Processability
14. Compositional Compliance
15. Environmental Compliance
16. Recycability
17. Graphics
18. Transportation Costs
19. Consumer Acceptance
20. Global Availability

FIG. 8

TABLE VI
Package Attributes Questionnaire:

1. What is the product to be packaged? Food, beverage, household cleaners, medical, hardware, other?
2. What is the physical state of the product as supplied? Solid, liquid?
3. What is the physical state of the product as packaged? Solid, liquid?
4. What volume or weight of product is to be packaged? Gms, ozs, lbs, pints, liters, gallons?
5. What are the properties of the product? Inert, mildly aggressive, stongly aggressive?
6. What type of package is required? Bag, carton, pouch, bottle, can, ampoule, cartridge, other?
7. Does the product need special protection? Sunlight, oxygen, shocks, extreme temperatures?
8. What shelf life does the product need? Indefinite, 4 weeks, 6 months, 1 year, other?
9. Will the package and its contents require special treatment? Boil-in-bag, pasteurization, autoclave, irradiation, sterilization, gas flush, other?
10. When will the product be packaged? In-Line with manufacture, out-of-line in manufacturing plant, at third party location?
11. In which market will the product be sold? Retail, industrial, professional, other?
12. How will the package be identified? Printed on package, applied labels?
13. What safety specifications must the package and its contents meet? FDA, USDA, state, other?
14. What standards must the package meet? ASTM, DIN, other?

INTEGRATED SYSTEM FOR DESIGNING PRODUCT PACKAGING

CROSS-REFERENCE TO RELATED APPLICATIONS

This application claims the benefit of the filing date of U.S. provisional application serial No. 60/246,037, filed Nov. 6, 2000 now abandoned.

BACKGROUND OF THE INVENTION

The present invention relates to the design of product packaging.

The design of a package and selection of its components are very critical phases in the development of a new item of packaged goods for sale to industrial or consumer outlets. The selection of the components for a product package is very complex. The components (e.g., substrates, printing inks, primers, lacquers, coatings, and adhesives) used must all meet a series of attributes based on three major factors: appearance, performance, and protection.

The package materials should be selected so that they will function efficiently in the convertors' manufacturing processes such as printing, coating, and laminating. Later, on the packaging line, the packaging materials must function in the equipment that forms, fills, and seals the packages. Physical characteristics such as tensile and burst strength, stiffness, elongation, softening, and melting points play a vital role in these processes.

The final package should appeal to the user. The outward appearance of the package will strongly influence the user in terms of effectiveness and value of the contents. The aesthetics of the package are a strong selling tool, particularly in the consumer goods markets. The appearance of the package is often the deciding factor in a buying decision in a supermarket. To ensure that the package projects the desired image, such factors as color, texture, appearance, and integrity are significant.

The final package should also be designed to deliver the product to the user in a pristine state so that it retains its appeal and function as long as possible. The package should protect the contents from contamination from outside pollutants, and should be made from components that meet all the appropriate food and drug safety laws. The final package should withstand a wide variety of physical and chemical conditions to ensure the users' safety and the contents' purity.

The selection of components capable of meeting such a wide range of attributes at an economical cost is a major task for most convertors and their customers—the consumer packaged goods manufacturers. The optimization of the selected components is a long, iterative process which may involve extensive, multiple shelf-life tests on possible structures before a suitable combination is approved. This is wasteful in terms of economics, time, and human resources.

SUMMARY OF THE INVENTION

The present invention is directed to a system that addresses some of the limitations and problems of the prior art. In particular, the present invention is directed to an integrated system that enables clients to design packages for consumer or industrial goods that meet their specific needs. The system relies on a cooperative effort by the suppliers of the components used in the manufacture of packages as well as the converters who perform package-manufacturing processes using those components. These suppliers and converters will provide information on their products and services in an agreed upon standardized format so that the system will be able to reject non-conforming products. The system generates one or more recommendations, referred to as packaging solutions, that identify those components and processes meeting the desired attributes entered by the user.

The present invention will reduce the iterations involved in prior-art procedures used to design a new package, saving both time and money. The cooperation between the suppliers and converters, and their use of common standards, will simplify the design process and reduce the possibilities for error. The resulting optimum package design will also reduce wastage of the packaged products due to breakage, spillage, or shelf-life limitations.

In one embodiment, the present invention is, at a server of a package design system, a computer-implemented method for generating a packaging solution for a proposed package for a client, comprising the steps of (a) providing a component database for a plurality of different available components from a plurality of different suppliers, wherein the component database identifies a set of characteristics for each available component; (b) providing a process database for a plurality of different available manufacturing processes from one or more different converters, wherein the process database identifies a set of characteristics for each available manufacturing process; (c) receiving a set of desired attributes for the proposed package; and (d) generating the packaging solution by comparing the set of desired attributes to the characteristics stored in the component and process databases.

In another embodiment, the present invention is an internet-based distributed computer system for generating a packaging solution for a proposed package for a client, comprising (a) a server configured to maintain (1) a component database for a plurality of different available components from a plurality of different suppliers, wherein the component database identifies a set of characteristics for each available component; and (2) a process database for a plurality of different available manufacturing processes from one or more different converters, wherein the process database identifies a set of characteristics for each available manufacturing process; and (b) at least one remote client node configured to transmit a set of desired attributes for the proposed package, wherein the server generates the packaging solution by comparing the set of desired attributes to the characteristics stored in the component and process databases.

In yet another embodiment, the present invention is a server for an internet-based distributed computer system for generating a packaging solution for a proposed package for a client, wherein the system further comprises one or more remote client nodes, the server comprising (a) a server processor; (b) a component database for a plurality of different available components from a plurality of different suppliers, wherein the component database identifies a set of characteristics for each available component; and (c) a process database for a plurality of different available manufacturing processes from one or more different converters, wherein the process database identifies a set of characteristics for each available manufacturing process; and the server processor receives a set of desired attributes for the proposed package from a remote client node corresponding to the client and generates the packaging solution by comparing the set of desired attributes to the characteristics stored in the component and process databases.

BRIEF DESCRIPTION OF THE DRAWINGS

Other aspects, features, and advantages of the present invention will become more fully apparent from the following detailed description, the appended claims, and the accompanying drawings in which:

FIG. 4 shows Table II, which identifies different types of substrates typically used in the packages identified in Table I;

FIG. 5 shows Table III, which identifies different types of inks typically used in the packages identified in Table I;

FIG. 6 shows Table IV, which identifies different types of adhesives typically used in the packages identified in Table I;

FIG. 7 shows Table V, which identifies different characteristics for each of the different types of substrates, inks, and adhesives identified in Tables F, G, and H, respectively;

FIG. 8 shows Table VI, which identifies typical queries that would be presented by the server of FIG. 1 to a client in order to identify a set of desired attributes for a proposed package.

DETAILED DESCRIPTION

Figure 1:
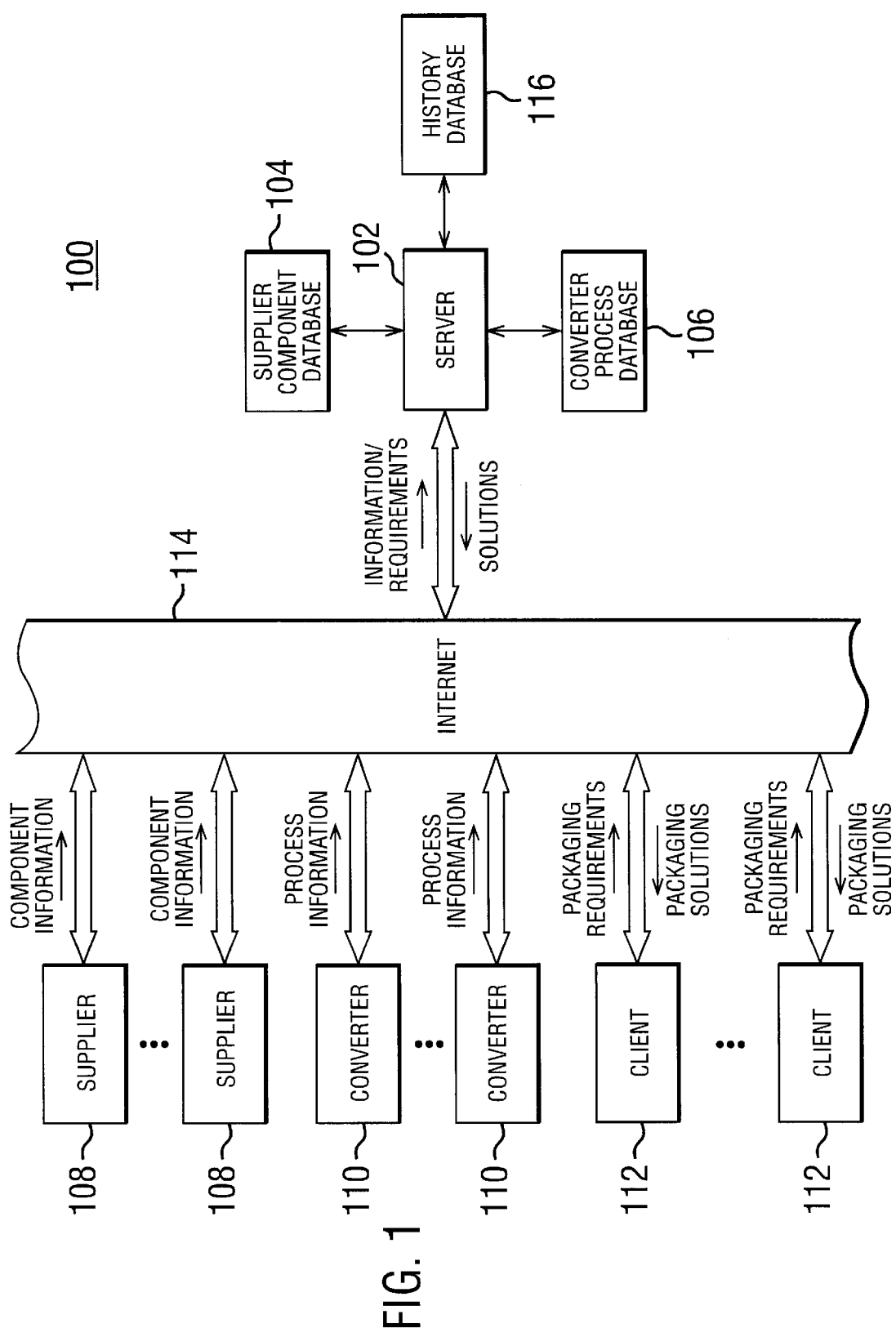
FIG. 1 shows a block diagram of a distributed package designing system, according to one embodiment of the present invention.

FIG. 1 shows a block diagram of distributed package designing system 100, according to one embodiment of the present invention. In addition to server 102, which maintains supplier component database 104 and converter process database 106, system 100 comprises one or more remote supplier nodes 108, one or more remote converter nodes 110, and one or more remote client nodes 112, each of which communicates with server 102 via the Internet 114. In a preferred implementation, each of server 102, supplier node(s) 108, converter node(s) 110, and client node(s) 112 is a personal computer (PC) running application software specifically designed to perform appropriate operations for system 100, although other suitable hardware and software configurations are certainly possible.

Figure 2:
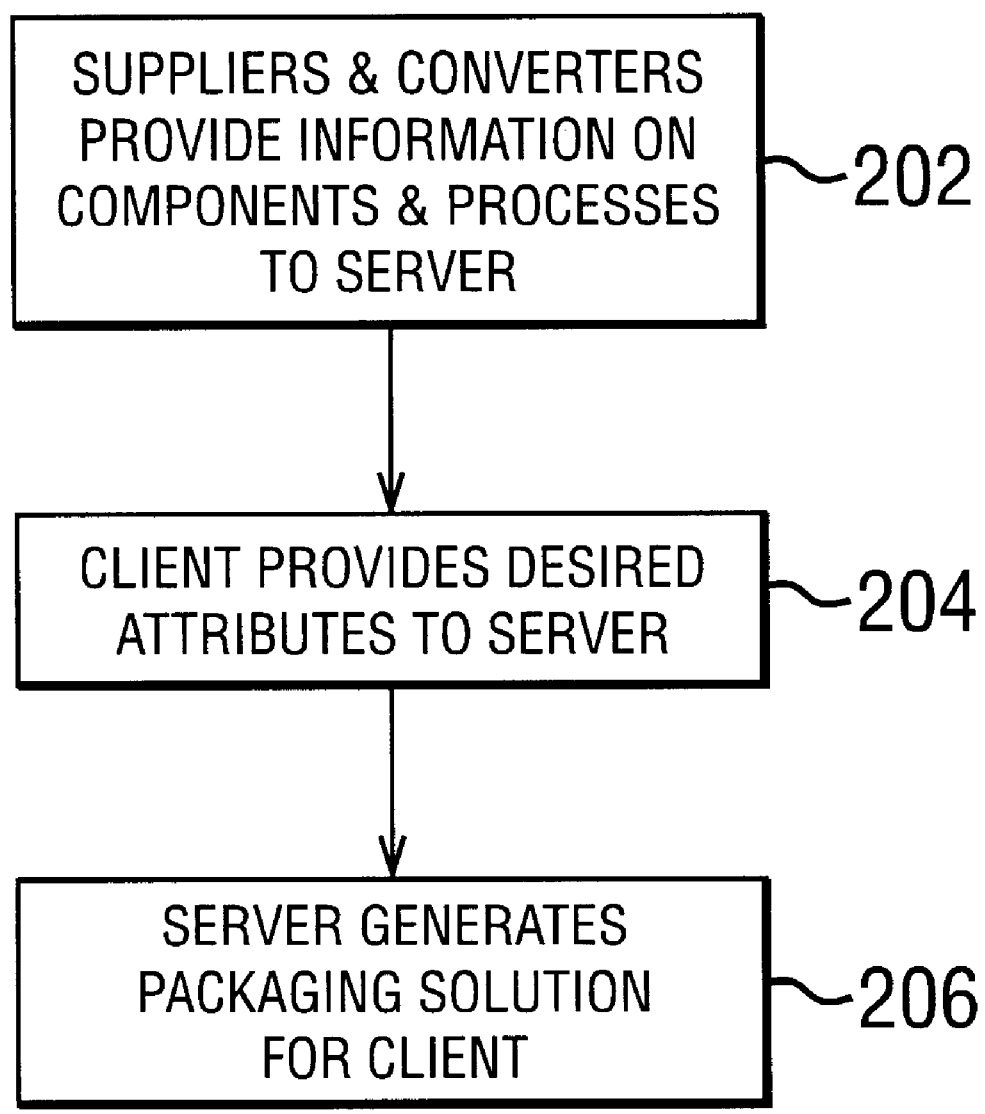
FIG. 2 shows a flow diagram of the processing implemented within the distributed package design system of FIG. 1.

FIG. 2 shows a high-level flow diagram of the processing implemented within system 100. Each supplier of one or more components potentially used in the manufacture of packages, uses its supplier node 108 to access server 102 via the Internet in order to store and/or update the component information stored in supplier component database 104 for the one or more components sold by that supplier (step 202 of FIG. 2). Similarly, each converter who provides manufacturing services potentially involved in the manufacture of packages, uses its converter node 110 to access server 102 via the Internet in order to store and/or update the process information stored in converter process database 106 for the one or more manufacturing processes performed by that converter (step 202). Each supplier/converter is responsible for ensuring that the information for its component(s)/process(es) is up-to-date and accurate.

Meanwhile, each client of the package-designing services provided by server 102 corresponds to a particular user of system 100 who wants to design a package for a particular product using one or more of the components sold by the suppliers who provide component information stored in supplier component database 104 and/or one or more of the manufacturing processes performed by the converters who provide process information stored in converter process database 106. Such a client uses its client node 112 to access server 102 via the Internet in order to submit desired attributes for a proposed package (step 204). This transfer of desired package attributes may be accomplished during an interactive Internet-based session involving a set of queries by the server and corresponding responses by the client. Alternatively or in addition, the transfer of desired package attributes may involve the client submitting a list of desired attributes using a standardized format for such data.

In either case, in response to the receipt of a set of desired package attributes for a new package, server 102 will access the supplier component information stored in database 104 and the converter process information stored in database 106 in order to generate a packaging solution tailored to the client's specified goals, which packaging solution is communicated back to the client over the Internet (step 206). In order to generate a packaging solution for a client, server 102 classifies and rates all of the possible components and/or manufacturing processes for a package against the set of desired attributes specified by the client for its proposed package.

The information transmitted from the server to the client regarding the packaging solution should identify the types and amounts of components and the different manufacturing processes used in generating the new package, as well as identifying the corresponding suppliers and converters. Depending on the implementation of server 102, the packaging solution may also include a step-by-step description of the manufacturing procedure for the new package, including a breakdown of the costs involved at the various steps (including, when appropriate, shipping costs between two different manufacturing facilities).

In addition, the packaging solution may include computer-generated images showing the package at various stages during the overall manufacturing procedure, including different views of the final package, both when empty and when configured (e.g., filled) with the ultimate product, if such views are appropriate. For example, if the packaging solution involves an opaque box, the differences between views of the final package empty versus filled will be minimal, if any. On the other hand, if the packaging solution involves a transparent plastic bag. The final package may look significantly different between empty versus filled.

Figure 3:
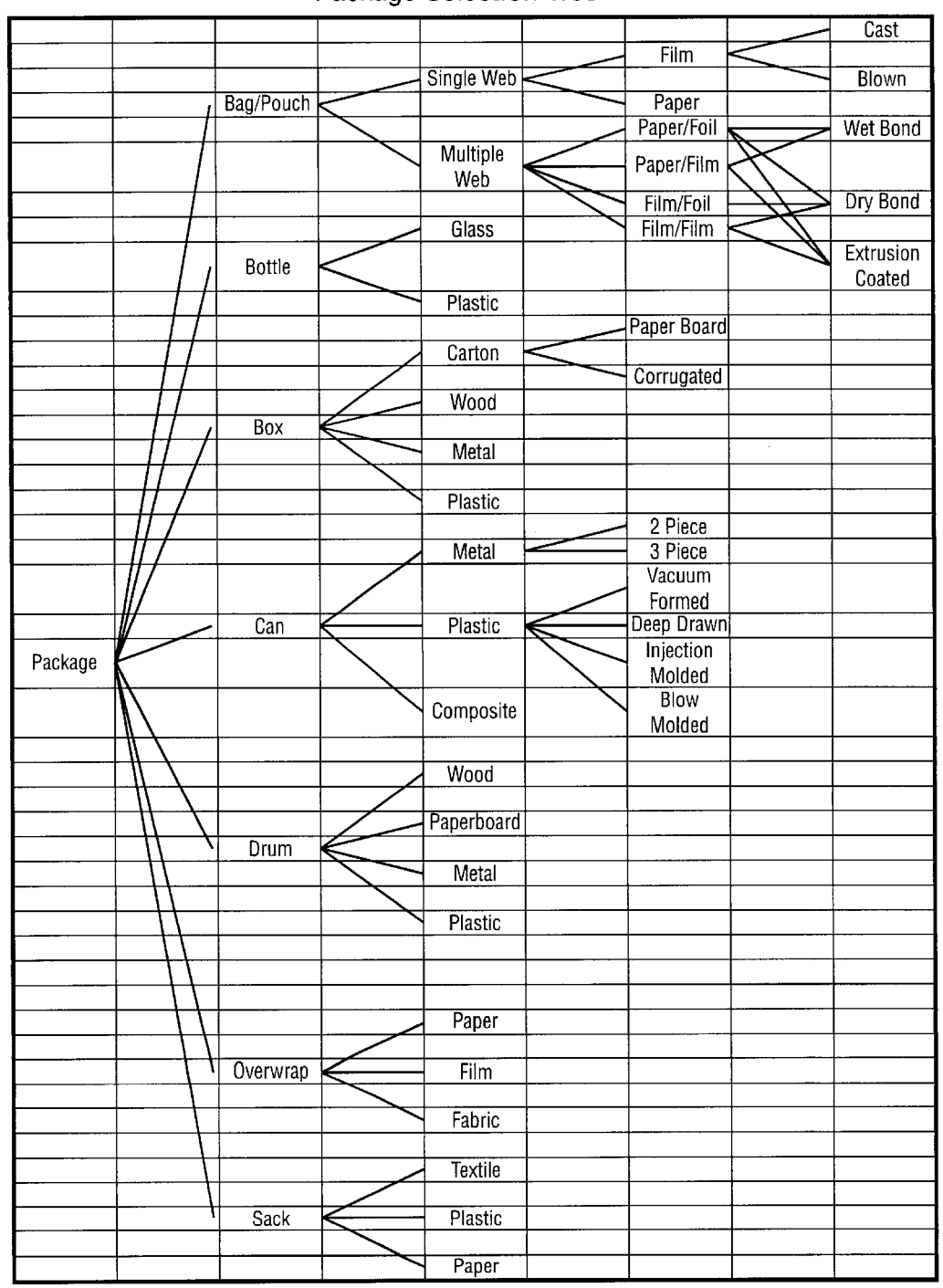
FIG. 3 shows Table I, which identifies typical types of packages and corresponding package materials that may be selected by the server of the distributed package design system of FIG. 1.

FIG. 3 shows Table I, which identifies typical types of packages that may be selected by server 102, as well as identifying typical types of materials used in such packages. In particular, the different types of packages include a bag or pouch, a bottle, a box, a can, a drum, an overwrap, and a sack.

Bags or pouches, for example, may be made from either a single-web or a multiple-web material. Single-web materials may be paper or a film, which in turn may be cast or blown. Similarly, multiple-web materials include laminates of paper/foil, paper/film, film/foil, and film/film. Paper/foil laminates may be either web-bonded, dry-bonded, or extrusion-coated; paper/film laminates may be wet-bonded or extrusion-coated; film/foil laminates are typically dry-bonded; and film/film laminates may be dry-bonded or extrusion-coated.

Bottles may be glass or plastic. Boxes may be plastic, metal, wood, or carton (e.g., either paper board or corrugated). Cans may be metal, plastic, or composite, where metal cans may be either two-piece or three-piece, and plastic cans may be either vacuum-formed, deep-drawn, injection-molded, or blow-molded. Drums may be wood, paperboard, metal, or plastic. Overwraps may be paper, film, or fabric. Sacks may be textile, plastic, or paper.

FIG. 4 shows Table II, which identifies different types of substrates typically used in the packages identified in Table I. FIG. 5 shows Table III, which identifies different types of inks typically used in the packages identified in Table I. FIG. 6 shows Table IV, which identifies different types of adhesives typically used in the packages identified in Table I.

FIG. 7 shows Table V, which identifies different characteristics for each of the different types of substrates, inks, and adhesives identified in Tables F, G, and H, respectively. In one embodiment of the present invention, for each component in component database 104, the supplier of that component identifies whether the component is a substrate, an ink, or an adhesive. The supplier also provides information for its component relating to each of the characteristics identified in Table V. In one implementation, depending on the particular characteristic, the characteristic information is provided by the supplier in the form of a relative rating, e.g., from 1 to 10. Alternatively or in addition, the information for one or more of the characteristics may be provided in absolute terms (e.g., cost in dollars per unit).

Similarly, suppliers and converters will provide the optimum running conditions on the conversion equipment for particular components. Such information may include physical dimensions of the substrates needed (e.g., width, length, thickness), surface treatment levels, running tensions, maximum drying temperatures, and rewind conditions. For inks, adhesives, and coatings, suppliers and converters would typically specify solvents and diluents, application solids contents and viscosities, coating weights, application cylinder cell etch information (e.g., number of lines per unit length, cell depth, cell shape, and cylinder composition), and running conditions (e.g., drying temperatures, air volumes, air velocity, laminating nip temperature and pressure, and roll hardness). These parameters would be entered on the printing press or laminator computer at the set-up of each run, adjusted by the operator during the run to optimize the results, and stored at the end of the run. These final settings would be recalled when the specific order is repeated.

By using standardized sets of characteristics from all of the different suppliers and converters, the server can assess whether individual components and/or manufacturing processes satisfy the desired attributes for a particular proposed package. In this way, potential incompatibilities between package components and manufacturing processes will be taken into consideration in the initial phase of the design sequence, thus eliminating incorrect choices. This provision of component and process characteristic information corresponds to the processing of step 202 of FIG. 2.

Of course, the information presented in Tables C, F, G, H, and J is neither necessary nor exhaustive; it is presented merely to give an example of typical types of packages, their typical constituent materials, and possible associated characteristics. In any particular implementation, items may be added and/or deleted from any of the various lists in these tables. Moreover, the set of characteristics may differ between different types of components, such as between substrates, inks, and adhesives. For example, tensile strength may be a relevant characteristic of substrates, but not of inks, while runnability may be relevant to inks, but not to substrates. Furthermore, the characteristics of one component may depend on the selection of another component. For example, the peel strength of an ink may vary depending on the particular substrate to which it is applied.

FIG. 8 shows Table VI, which identifies typical queries that would be presented by server 102 to a client in order to identify a set of desired attributes for the proposed package. The queries in Table VI correspond to one possible implementation of step 204 of FIG. 2. The questions and corresponding choices presented in Table VI are neither necessary nor exhaustive; they are presented merely to give an example of typical queries used to get the client to identify a set of desired package attributes. In any particular implementation, questions and/or their corresponding choices may be added and/or deleted from Table VI.

Figure 9:
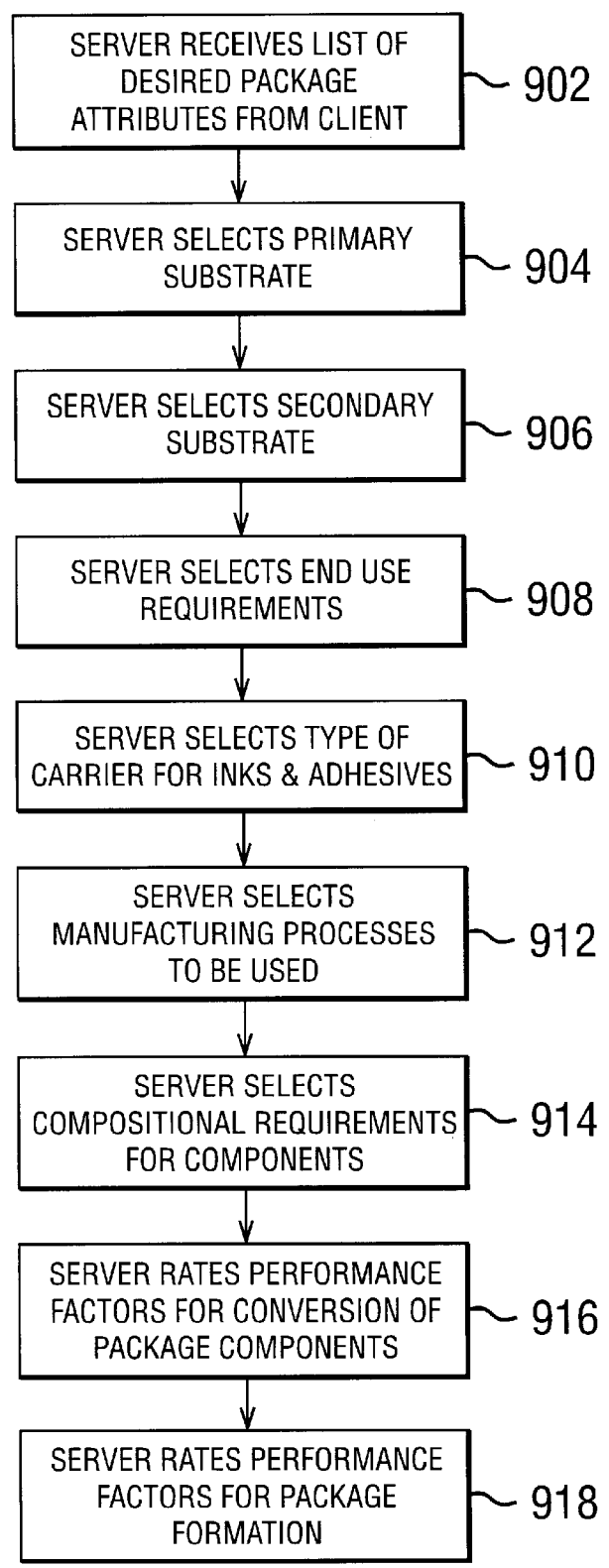
FIG. 9 shows a flow diagram of the processing implemented by the server of FIG. 1 to generate a packaging solution from a set of desired attributes selected by a client for a proposed package.

FIG. 9 shows a flow diagram of the processing implemented by server 102 of FIG. 1 to generate a packaging solution from a set of desired attributes selected by a client for a proposed package. The processing of FIG. 9 corresponds to one possible implementation of step 206 of FIG. 2. In particular, server 102 receives a set of desired package attributes from a client (step 902 of FIG. 9). Server 102 compares the set of desired package attributes to the information in supplier component database 104 and converter process database 106 to select the components and manufacturing processes that best meet the desired attributes selected by the client for the proposed package. In particular, server 102 selects a primary substrate (step 904), a secondary substrate (step 906), end use requirements (step 908), the type of carrier for inks and adhesives (step 910), one or more manufacturing processes to be used (step 912), and compositional requirements for the components (step 914). In addition, server 102 rates performance factors for the conversion of the package components (step 916) and for package formation (step 918).

When more than one substrate is involved, the primary substrate refers to the most stable substrate to which a printing ink, adhesive, or coating is applied. The primary substrate typically shows less deformation when passed through coating units and drying ovens. A secondary substrate is a substrate that is less stable than the primary substrate and is therefore more likely to stretch under tension or shrink on passage through the drying tunnel. As such, a secondary substrate should be handled with more caution than the primary substrate.

End use requirements refer to the requirements specified by the manufacturer of consumer packaged goods for the final package. These will include physical dimensions, physical characteristics such as burst strength, peel strength, heal seal strength, and crush resistance. Package performance in terms of heat stability (e.g., boil-in-bag, hot-fill, pasteurization, retortability), abrasion resistance, aggressive contents (e.g., acid, grease, or essential oils), puncture resistance, moisture resistance, gas barrier, light transmission, etc. The end user may also specify acceptable color matching, print quality, bar code scannability, etc.

Inks and adhesives are typically applied as fluids. Many of these resin-based systems are supplied in a carrier medium such as organic solvents or water. Others are supplied as low molecular weight resins that are fluid at operating temperatures of ambient to several hundred degrees.

In most countries, package materials that may migrate into packaged food or drugs are classified as potential food or drug additives. As such they are regulated in the same way as any ingredient added directly to the food or drug. In the United States, the Food & Drug Administration (FDA)

issues regulations concerning the compositional requirements of packaging materials under the reference 21CFR. For example, Chapter 175.105 covers adhesives. Other chapters cover substrates and other coatings. Similar regulations have been issued by the European Community. Other regulations may be issued by other bodies, including the consumer package goods manufacturer, to cover such items as heavy metal content or types of solvent. Many countries also issue lists on environmental and health and safety grounds of registered chemicals. Only chemicals appearing in these registries may be used commercially in such countries. In preferred implementations of the present invention, server 102 of FIG. 1 will be able to access data on product registrations for different countries. This will prevent a package component from being selected for a country in which the product is not registered. These features are referred to as compositional requirements for the components.

Performance factors for the conversion of the package components and for package formation refer to the running conditions for manufacturing processes described earlier in this specification.

The databases used by the server to make package design decisions are critical to the success of the present invention. In particular, success relies on the broad ranges of attributes stored and the inter-relationships between the components of a package, its contents, manufacture, and end use. The following examples show some of the factors that influence the choice of components of a package structure and their interrelationship.

(1) Pouch for Pre-Cooked Meals

This example relates to a pouch for precooked meals of a type used in institutional catering establishments such as canteens, hospitals, schools, or military MRE (Meals Ready to Eat). For example, the meal may be a meat stew that is packed in 250 g portions in a pouch in the food processing plant. Subsequent to shipping, the pouch and its contents are autoclaved for 20 minutes at 127° C. This ensures a sterile product with a long shelf life. To withstand the processing conditions, the components of the pouch must withstand the high autoclave temperatures. Suitable substrates include polyester or polyamide films to provide mechanical strength and puncture resistance; aluminum foil to provide even heat transmission and act as a barrier to light; and a polyolefine heat seal layer, such as cast polypropylene, to resist the oils in the food stuff and not soften and fail at the heat seal areas during autoclaving. The inner surface of the aluminum foil may be primed with a vinyl wash coat to prevent attack by any essential oils in the contents. The three or four layers will be laminated together by an adhesive that also has sufficient heat and chemical resistance to survive the conditions during autoclaving. Finally, all the components in direct or indirect contact with the food contents must meet the relevant FDA regulations (e.g., 21 CFR 177.1390 covering laminates used at temperatures above 250° F.). Substrates such as Low Density Polyethylene and Oriented Polypropylene do not withstand the autoclave temperatures without softening. Softening would cause failure at the heat seal areas, leading to package disintegration. Similarly, an unsuitable adhesive would not withstand the processing conditions and lead to package failure. As this type of pouch is usually sold to the consumer in a carton, there is little need for any more than simple graphics on the pouch itself. However, any ink used must withstand the autoclave temperatures, adhere to the polyester film, and not interfere with the cross-linking of the adhesive.

(2) Pouch for Potato Chips

In this case, the pouch is the primary selling aid for the contents. As such, the package sitting on the sales shelf should immediately impress the retail consumer of its appeal. The colors should be vibrant; the package should stand up and not collapse on the shelf. When the package is opened, the contents should be fresh and show no signs of sogginess due to moisture penetration, nor should they be rancid due to oxidation or exposure to sunlight. The substrates for the package should therefore have the mechanical strength to prevent collapsing on the shelf and sufficient barrier properties to moisture, sunlight, and oxygen to keep the contents fresh for the desired shelf life (e.g., 6 weeks). Furthermore, there should be no tainting of the contents by traces of retained solvents in the printing inks or laminating adhesives. A typical structure for such a package would be a clear outer-oriented polypropylene film, corona-treated on the inner surface to a minimum of 38 dynes per centimeter, reverse-printed in flexo, laminated with an aqueous dry-bond adhesive to a metallized oriented coextruded polypropylene film, with a heat seal layer on the non-metallized side.

(3) Magazine Cover Laminated with an Overprint Film

In this case, the film chosen may be cellulose acetate, oriented polypropylene, or polyester, depending on the publisher's decision on cost versus appearance. The inks used to print the magazine cover should not contain phthalocyanine pigments as these will react with a urethane laminating adhesive causing discoloration. The choice of solvents in the adhesive is critical. For example, toluene, which is recommended for its performance on cellulose acetate films, cannot be used on oriented polypropylene films. This film performs better with ethyl acetate solvent, which is not good with cellulose acetate. The adhesive should be specially formulated to give high green tack to prevent de-lamination when the laminated sheets are separated immediately after lamination.

In all the above cases, possible interactions of the various components of the package are discussed. In the current state of the art in package design, each characteristic of a component is discussed with the supplier. Under embodiments of the present invention, all these characteristics would be stored in the databases with appropriate ratings.

In one embodiment of the present invention, server 102 is able to save packaging solutions or even partial packaging solutions from previous package design runs in history database 116 of FIG. 1. In addition, server 102 may be able to be pre-programmed with a number of partial or complete packaging solutions, also stored in database 116. These existing packaging solutions may be identified by, e.g., selected keywords and accessed by server 102 during subsequent package-design runs either for the same client or possibly for other clients. Such a learning process may even further accelerate the design process by allowing clients to use these existing packaging solutions as building blocks for their proposed packages. In one embodiment of the present invention, server 102 is able to modify an existing packaging solution based on differences in one or more of the desired attributes for the proposed package, for example, different raw materials or changes in costs.

History database 116 functions as a library of partial or even complete packaging solutions for clearly defined applications. These existing solutions would be based on the suppliers' best experiences and would be of assistance to new entrants into package designing. As the system gets used, a series of existing solutions would be formulated based on input by the clients. These solutions would be added to the library stored in history database 116. With such a library in place, at the start of a package designing session, a client could be offered choices of (a) running a complete search program based on desired attributes, (b) searching through the library of existing solutions (e.g., stored under corresponding key words), or (c) revisiting solutions from that client's previous sessions.

In certain implementations, in addition to functioning as a package designing system, system 100 also functions as a procurement system. In particular, system 100 enables each client to procure the components and/or request the manufacturing services that it will use to manufacture the packaging solution generated by server 102 from the corresponding suppliers and/or converters by using its client node 112 to transmit procurement orders to the corresponding supplier nodes 108 and/or converter nodes 110 via server 102 and the Internet. In that case, server 102 functions as a central clearing house for the procurement of components and manufacturing services by clients from suppliers and converters. Note that, for such an implementation, FIG. 1 shows bidirectional communication with each supplier node 108 and each converter node 110. In order to track procurement histories, server 102 uses the component/process procurement information that passes through server 102 from the clients to the suppliers and converters to maintain client histories in history database 116 that track the procurement/utilization history of each component and process by each client.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. At a server of a package design system, a computer-implemented method for generating a packaging solution for a proposed package for a client, comprising the steps of:

(a) providing a component database for a plurality of different available components from a plurality of different suppliers, wherein the component database identifies a set of characteristics for each available component;

(b) providing a process database for a plurality of different available manufacturing processes from one or more different converters, wherein the process database identifies a set of characteristics for each available manufacturing process;

(c) receiving a set of desired attributes for the proposed package; and (d) generating the packaging solution by comparing the set of desired attributes to the characteristics stored in the component and process databases.

2. The invention of claim 1, wherein:

step (a) comprises the step of receiving the set of characteristics for each available component from a remote supplier node corresponding to a supplier;

step (b) comprises the step of receiving the set of characteristics for each available manufacturing process from a remote converter node corresponding to a converter;

step (c) comprises the step of receiving the set of desired attributes for the proposed package from a remote client node corresponding to the client; and step (d) comprises the step of transmitting information about the packaging solution to the remote client node.

3. The invention of claim 2, wherein communications between the server and the remote supplier, converter, and client nodes occur via an internet.

4. The invention of claim 2, wherein the information about the packaging solution includes an identification of one or more components and one or more manufacturing processes for the packaging solution.

5. The invention of claim 2, wherein the information about the packaging solution includes a step-by-step description of a manufacturing procedure for the packaging solution.

6. The invention of claim 2, wherein the information about the packaging solution includes one or more images corresponding to the packaging solution.

7. The invention of claim 1, further comprising the step of maintaining a history database containing one or more existing packaging solutions, wherein step (d) further comprises the step of accessing the history database to select and use an existing packaging solution in generating the packaging solution for the proposed package for the client.

8. The invention of claim 7, wherein at least one existing packaging solution corresponds to a packaging solution from a previous package design run.

9. The invention of claim 7, wherein at least one existing packaging solution corresponds to a pre-programmed packaging solution.

10. The invention of claim 7, wherein at least one existing packaging solution corresponds to a partial packaging solution.

11. The invention of claim 7, wherein step (d) further comprises the step of modifying the selected existing packaging solution based on differences in one or more desired attributes to generate the packaging solution.

12. The invention of claim 1, wherein step (c) comprises the step of implementing an interactive query session with the client to identify the set of desired attributes.

13. The invention of claim 1, wherein step (c) comprises the step of receiving the set of desired attributes in a standardized format.

14. The invention of claim 1, wherein the available components include different types of substrates, inks, and adhesives.

15. The invention of claim 1, wherein one or more characteristics for one or more types of the components are rated using a relative scale.

16. The invention of claim 1, wherein the server enables the client to procure a component from a corresponding supplier using a remote client node.

17. The invention of claim 1, wherein each set of characteristics corresponding to a component conforms to an appropriate standardized format.

18. An internet-based distributed computer system for generating a packaging solution for a proposed package for a client, comprising:
- (a) a server configured to maintain:
  - (1) a component database for a plurality of different available components from a plurality of different suppliers, wherein the component database identifies a set of characteristics for each available component; and
  - (2) a process database for a plurality of different available manufacturing processes from one or more different converters, wherein the process database identifies a set of characteristics for each available manufacturing process; and
- (b) at least one remote client node configured to transmit a set of desired attributes for the proposed package, wherein the server generates the packaging solution by comparing the set of desired attributes to the characteristics stored in the component and process databases.

19. The invention of claim 18, further comprising:
- (c) one or more remote supplier nodes configured to provide access to the component database by each supplier to update the set of characteristics for each available component corresponding to each supplier; and
- (d) one or more remote converter nodes configured to provide access to the process database by each converter to update the set of characteristics for each available manufacturing process corresponding to each converter.

20. A server for an internet-based distributed computer system for generating a packaging solution for a proposed package for a client, wherein the system further comprises one or more remote client nodes, the server comprising:
- (a) a server processor;
- (b) a component database for a plurality of different available components from a plurality of different suppliers, wherein the component database identifies a set of characteristics for each available component; and
- (c) a process database for a plurality of different available manufacturing processes from one or more different converters, wherein:
  - the process database identifies a set of characteristics for each available manufacturing process; and
  - the server processor receives a set of desired attributes for the proposed package from a remote client node corresponding to the client and generates the packaging solution by comparing the set of desired attributes to the characteristics stored in the component and process databases.

21. The invention of claim 20, wherein the system further comprises:
- one or more remote supplier nodes configured to provide access to the component database by each supplier to update the set of characteristics for each available component corresponding to each supplier; and
- one or more remote converter nodes configured to provide access to the process database by each converter to update the set of characteristics for each available manufacturing process corresponding to each converter.

* * * * *